Figure 1:
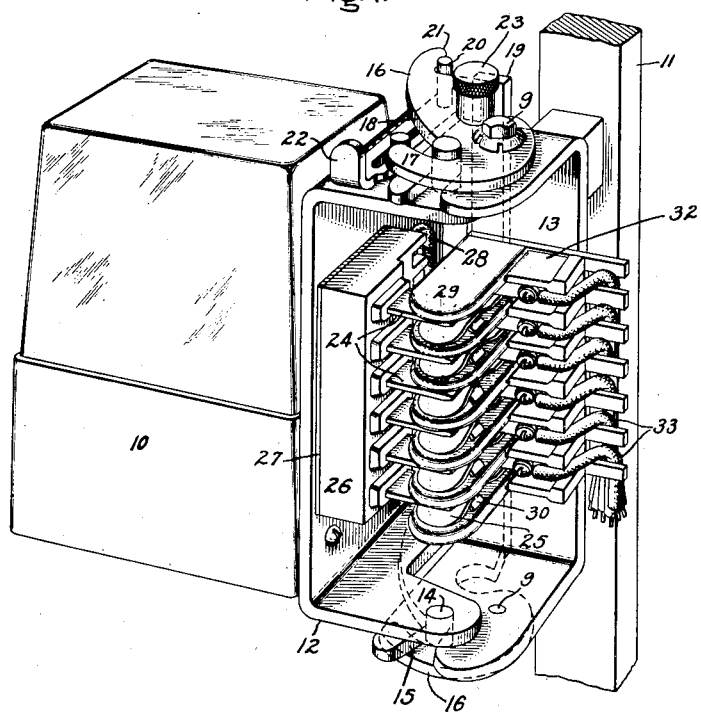

June 7, 1938.  L. J. LINDE  2,120,103
DEVICE MOUNTING
Filed Dec. 28, 1934  2 Sheets-Sheet 1

Inventor:
Leonard J. Linde,
by Harry E. Dunham
His Attorney.

June 7, 1938.                L. J. LINDE                2,120,103
                          DEVICE MOUNTING
                      Filed Dec. 28, 1934            2 Sheets-Sheet 2

Inventor:
Leonard J. Linde,
by Harry E. Dunham
His Attorney.

Patented June 7, 1938

2,120,103

UNITED STATES PATENT OFFICE 2,120,103

DEVICE MOUNTING

Leonard J. Linde, Aldan, Pa., assignor to General Electric Company, a corporation of New York Application December 28, 1934, Serial No. 759,557

17 Claims. (Cl. 173—328)

My invention relates to improvements in mountings for devices, especially when they are in confined spaces, and more particularly to electroresponsive devices, such for example as relays, meters, etc.

The so-called low-voltage network distribution systems embody network protectors whose function is to disconnect the network from the feeders in case of feeder faults, and also in some installations to prevent transformer magnetizing current losses when the feeder is open. The protectors include, among other things, a circuit breaker, operating mechanism therefor, relays and other devices. In many cases, these protectors are in vaults and have to be in a water-tight casing of small dimensions because the vaults are restricted in size, due principally to the economics of space requirements and cost of vault construction. Nevertheless, the different devices must be readily available for inspections and repairs, and readily removable for repairs and replacements. Since the height of the protector casing is limited by the depth of the vault, and the width and thickness of the casing are limited by the size of the manhole opening, which is frequently circular, the casing has to be relatively thick in comparison with its width and height. This necessitates the mounting of certain devices in front of others. Consequently, it becomes necessary to have the devices in the front plane, for example, so mounted as to be movable for inspection, repairs and replacements of the devices in back. Moreover, it is highly desirable to have the various devices, especially relays, so mounted that they can be readily removed or replaced, preferably without tools, particularly in view of the cramped quarters for working. This implies, as it were, the elimination of flexible leads, which require disconnection and subsequent reconnection whenever a device is to be removed or replaced. Also, where flexible leads have been employed, as in the past with hinged panels on which the devices were mounted, the bending of the leads was harmful and the extra panel was not only a space consuming factor but also required the use of tools in connection with inspection and maintenance.

In order to avoid these difficulties, an object of my invention is to provide an improved mounting which reduces space requirements to a minimum and permits the mounting and dismounting of a device without the use of tools. Another object of my invention is to provide a mounting such that the device may be locked in its normal position and yet readily swung therefrom without dismounting. A further object of my invention is to provide for electroresponsive devices a mounting which minimizes the number of high resistance connections, permits swinging a device without any interruption of the circuits thereto and does away with flexible leads, thereby eliminating the bending of such when the device is swung from one position to another, and also their disconnection when it is desired to remove a device and the subsequent connection when a new device is installed or the old one replaced.

My invention will be better understood from the following description when considered in connection with the accompanying two sheets of drawings, and its scope will be pointed out in the appended claims.

Figure 2:
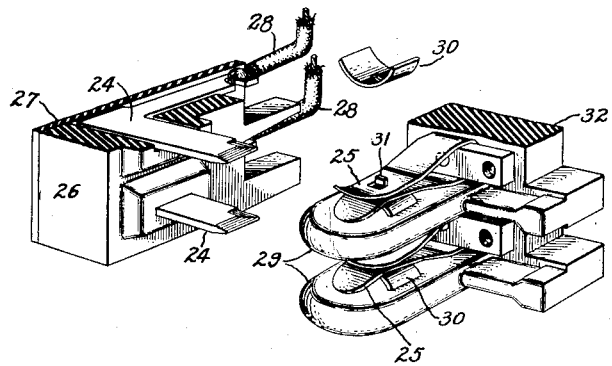
Figure 3:
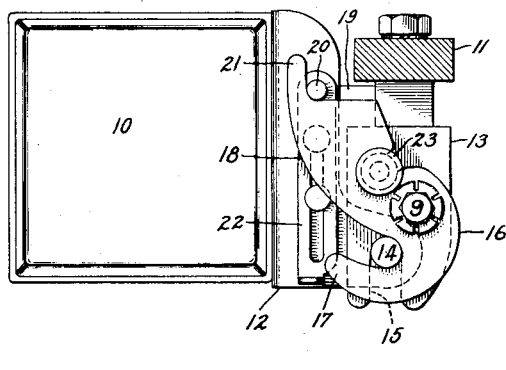
Figure 5:
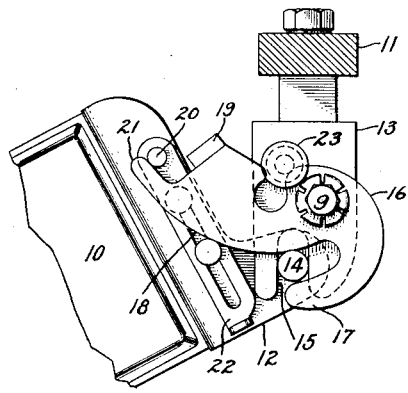
Figure 4:
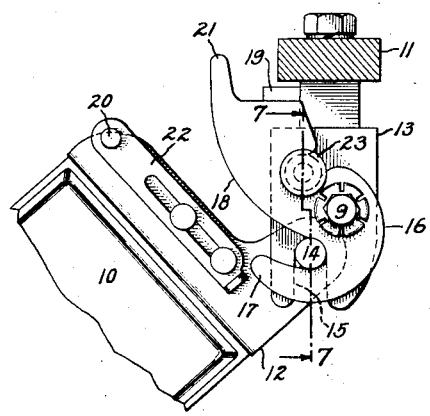
Figure 6:
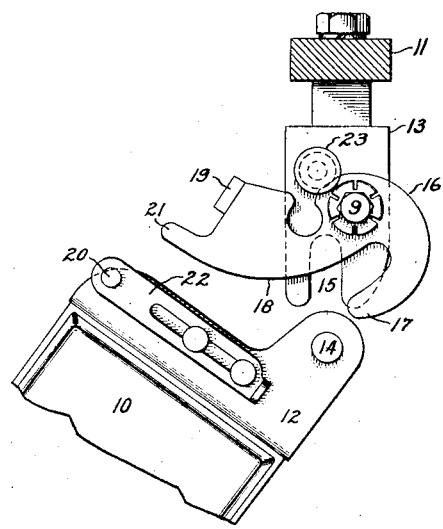
Figure 7:
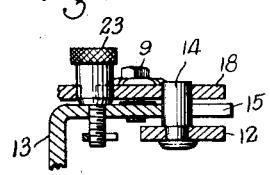

In the accompanying drawings, Fig. 1 illustrates in perspective a mounting embodying my invention in connection with an electroresponsive device; Fig. 2 is an exploded perspective view of my pivotal contact arrangement shown in Fig. 1; Fig. 3 is a top plan view of Fig. 1, showing the device mounted and locked in its normal position; Fig. 4 is a top plan view showing the device swung from its normal position with the pivotal mounting locked in position; Fig. 5 is a top plan view showing the pivotal mounting unlocked and the device partly swung out for removal from its support; Fig. 6 is a top plan view with the device shown as it would be if just removed or ready for mounting; and Fig. 7 is a section on the line 7—7 of Fig. 4.

Referring now to the drawings, a device 10, which may be a relay although my invention is not limited to such, is to be pivotally supported on and demountable from a support 11 which may be, for example, a bar or frame member within the casing of a network protector. For suitably supporting the device 10, it and the support 11 may be provided with engageable cooperating means, such as brackets 12 and 13, respectively, secured in any suitable manner to the device and the support. One of the brackets 12, for example, has on its arms pivotal elements such as pins 14 which are insertable in suitable slots 15 open at one end, see especially Fig. 6, in the arms of the other bracket 13.

In order to hold the pivotal mounting and at the same time provide for readily mounting and demounting without tools, I provide actuating means for closing the open end of the slots 15, so arranged that movement in one direction will effect a given movement of the bracket 12 to force the pins 14 into the normal pivotal position, and movement in the opposite direction will force them from the slots 15. As shown, this means comprises one or more cams 16 pivotally mounted at 9 on the arms of the bracket 13 eccentrically to the pivotal axis of the device 10 and so shaped as to provide a hook portion 17 which engages and forces the pin 14 inwardly when the pin is inserted in the opening and the cam 16 is turned in one direction, clockwise with reference to Fig. 6. For demounting, each of the cams 16 is further provided with a face 18 of such alinement that movement of the cam in the opposite direction, counterclockwise with reference to Fig. 6, forces the pins 14 from the openings 15. In order to effect the closing in or hooking action of the cams, they may be suitably connected by a member 19 either integral with the cams or suitably secured thereto and arranged to be in the path of movement of the arms on the bracket 12 so as to be engaged thereby when the pins 14 are inserted into the openings 15 and the device 10 is turned into its normal position illustrated in Figs. 1 and 3. In order to effect the forcing out action, I provide means such as a movable projection or pin 20 which can be operated at will to a position such as to engage an angle in the cam formed by a projection such as a nose 21 on the cam. The pin 20 may be mounted on a member 22 slidably mounted on an arm of the bracket 12. The pin 20 is shown in the retracting position in Figs. 1, 3 and 5.

In order to lock the device 10 in its normal position so that it can be neither removed nor rotated, I provide means such as a knurled nut 23 which engages a cooperating threaded member secured to the upper arm of the bracket 13. For convenience in centering, the nut 23, as shown in Fig. 7, may have a bevelled lower face which, upon turning the nut clockwise with reference to Figs. 3-6, engages a notch in the upper cam 16 to lock it against movement. This prevents the opening movement of the cam but the device 10 can be swung about its pivotal axis by pushing in the slide 22 so that the pin 20 thereon clears the nose 21 of the cam, as shown in Fig. 4. If it is desired to lock the device in the normal position against pivotal movement, the slide 22 is pulled out to the position shown in Fig. 1 after the device has been moved to the normal position so as to cause the pin 20 to rest in the cam recess back of the nose 21.

In order to eliminate flexible leads and to minimize the number of high resistance terminal connections and also to avoid the necessity for connecting and disconnecting the terminals when the device 10 is to be mounted or demounted, I provide cooperating contacts or terminals on the device and support which are engageable with each other throughout the range of pivotal motion of the device and which may engage each other substantially in the line of the pivotal axis of the device throughout the range of its movement. As shown, these contacts or terminals comprise blade terminal contacts 24 carried by the device 10 and clip contacts 25 mounted on the bracket 13, the former having suitably bevelled edges which are readily insertable in the latter. Where a plurality of contacts are necessary, they are arranged in line on each of their respective supporting devices so as to engage each other when the pivot pins 14 are in their final pivotal position at points which may be substantially in line with the pivotal axis of the device 10. In order to allow for variations in manufacture and assembly, I preferably arrange the blade terminal members 24 in a terminal block 26 of suitable insulating material in such a way that they have a limited movement in the direction of the axis of rotation to allow for inequalities in spacing. In order to simplify the contact construction, the block 26 may be of molded material provided with openings slightly deeper than the thickness of the blades through which the blades are inserted from the back and then subsequently held in place by securing the block 26 to the device 10, an intervening backing plate 27 of suitable insulating material being provided where necessary. With this construction it then becomes possible to solder the leads 28 to the blade terminals 24 since it is unnecessary to connect or disconnect these leads in order to mount or demount the device. In order that the heating action of the current may not affect the resiliency of the clip contacts 25, these may be constructed in the manner shown wherein the clip contacts 25 are separated by insulating walls 29 which serve to hold in place spring members 30 which carry no current. These spring members, being arcuate in form, press the contact elements of the respective clips toward each other and are held in place by being provided with a hole which engages a lip 31 punched out of the clips. The clip contacts 25 are supported in a terminal block of suitable insulating material to which are connected the circuit leads 33 to the control and energizing circuits of the device 10. For maintaining these leads 33 in position the insulating block 32 may have in back of it or as an integral part of it a series of spaced projections through which the circuit wires 33 are threaded before being screwed to the terminal block, as shown in Fig. 1.

In further explanation of the operation of the invention herein described, it will be assumed that it is desired to mount the device 10. Reference will now be had to Fig. 6 and it will be assumed that the device 10 is moved toward the openings 15 so that the pins 14 register therewith. As the device is pushed into the openings to engage the cam face 18, the cam will be rotated clockwise and the contacts 24 will enter the contact clips 25. As the pins 14 engage the cam faces 18 and the device 10 is turned clockwise, the arms on the bracket 12 engage the member 19 connecting the cams 16 and produce clockwise movement of the cams, thereby causing the hooked portions 17 to engage the pins 14 and force them into the inner end of the slots 15 until the parts are positioned as shown in Figs. 3 and 4. This forcing action upon initial engagement of the pins 14 with the slots 15 effects relative translatory movement thereof. The device 10 may be then locked in the normal position by screwing down on the knurled nut 23 and pulling the slide 22 forward to engage in the cam recess so as to lock the device against pivotal movement as shown in Fig. 3. The device may be swung outwardly at any time without demounting by merely reversing the movement of the slide 22 so that the pin 20 thereon will clear the nose 21 of the cam, as shown in Fig. 4. Whenever it is desired to remove the device 10, the knurled nut 23 is loosened to permit rotation of the cam but the slide 22 is left in such a position that the pin 20 thereon engages the nose 21 on the cam. If the device 10 is then turned counterclockwise, as shown in Fig. 5, the pin 20 engages the cam 16 and thereby causes a counterclockwise movement of the cam about its pivot 9. This counterclockwise movement of the cam 16 effects relative translatory movement between the pins 14 and the slots 15 to effect disengagement thereof. Further movement continues the counterclockwise rotation of the cam until the position shown in Fig. 6 is reached, where the end of the opening 15 is cleared by the cam hook 17 and the pins 14 may be withdrawn so as to take away the device 10.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, a support, an electroresponsive device, cooperating means on said support and said device for pivotally supporting said device including means engageable by the device for producing a translatory movement thereof relatively to said support in response to a predetermined rotation of the device and relatively movable cooperating contact terminals on said device and on said support engageable with each other substantially in the line of the pivotal axis of said device throughout the range of the angular movement thereof.

2. In combination, a support, an electrical device to be supported, an electrical contact on said support and a cooperating contact on said device, engageable co-operating means on said support and said device for pivotally supporting said device, constructed and arranged upon initial engagement for translatory movement relatively to each other before attaining the pivotal position, and means on said device for effecting said translatory movement in response to a predetermined rotation of the device.

3. In combination, a support, a device to be supported, engageable co-operating means on said support and said device for pivotally supporting said device, constructed and arranged upon initial engagement for translatory movement relatively to each other before attaining the pivotal position, means on said device for effecting said translatory movement, in response to a predetermined rotation of the device, and means for locking said device against pivotal movement after the completion of said translatory movement.

4. In combination, a support, a device to be supported, engageable co-operating means on said support and said device for pivotally supporting said device, constructed and arranged upon initial engagement for translatory movement relatively to each other before attaining the pivotal position, means for effecting said translatory movement, in response to a predetermined rotation of the device, means for locking said device against pivotal movement after the completion of said translatory movement, and means for effecting said translatory movement in the reverse direction, in response to a reverse rotation of the device, whereby to dismount said device from said support.

5. In combination, a support having a projection provided with an opening, a device to be supported having a pivotal element insertable in the opening in said projection and rotatable therein, a cam member pivotally mounted on said projection and so shaped as in one position to permit the entry of said element into said opening, and upon turning of the cam member in one direction to force said element into its final position and close the open end of said opening, and means on said device cooperating with said cam member to effect the turning thereof in said direction.

6. In combination, a support having a projection provided with an opening, a device to be supported having a pivotal element insertable in the opening in said projection and rotatable therein, a cam member pivotally mounted on said projection and so shaped as in one position to permit the entry of said element into said opening, and upon turning of the cam member in one direction to force said element into its final position and close the open end of said opening, means on said device cooperating with said cam member to effect the turning thereof in said direction, and means for locking said cam member at the end of the movement thereof in said direction.

7. In combination, a support having a projection provided with an opening, a device to be supported having a pivotal element insertable in the opening in said projection and rotatable therein, a cam member pivotally mounted on said projection and so shaped as in one position to permit the entry of said element into said opening, and upon turning of the cam member in one direction to force said element into its final position and close the open end of said opening, means on said device cooperating with said cam member to effect the turning thereof in said direction, means for locking said cam member at the end of the movement thereof in said direction, and means on said device movable relatively thereto for locking the device in one position against turning when said cam member is locked.

8. In combination, a support having a projection provided with an opening, a device to be supported having a pivotal element insertable in the opening in said projection and rotatable therein, a cam member pivotally mounted on said projection and so shaped as in one position to permit the entry of said element into said opening, and upon turning of the cam member in one direction to force said element into its final position and close the open end of said opening, means on said device cooperating with said cam member to effect the turning thereof in said direction, and means operable when in one position for effecting a movement of the cam member in the opposite direction upon movement of the device from its normal position whereby to force the pivotal element outwardly in the opening.

9. In combination, a support, an electro-responsive device, cooperating means on said support and said device for pivotally supporting the device, a plurality of clip contacts mounted in line on said support, a plurality of blade terminal contacts mounted on said device for a limited movement in the direction of said line for registry with said clip contacts, said blade terminal contacts being respectively engageable with said clip contacts at points substantially in line with the pivotal axis of said device.

10. In combination, a support, a device to be supported, engageable cooperating means on said support and said device for pivotally supporting the device, actuating means mounted on one of said cooperating means and movable relatively thereto to effect pivotal engagement of said cooperating means when said device is positioned to initiate the engagement of said cooperating means and turned in one direction, and means for locking said actuating means against movement when said cooperating means are in complete pivotal engagement whereby to permit pivotal movement of said device.

11. In combination, a support, a device to be supported, engageable cooperating means on said support and said device for pivotally supporting the device, actuating means mounted on one of said cooperating means and movable relatively thereto to effect pivotal engagement of said cooperating means when said device is positioned to initiate the engagement of said cooperating means and turned in one direction, means for locking said actuating means against movement when said cooperating means are in complete pivotal engagement whereby to permit pivotal movement of said device, and means associated with said device operative in one position to engage said actuating means in the locked position thereof to prevent pivotal movement of the device while the actuating means is locked.

12. In combination, a support, a device to be supported, engageable cooperating means on said support and said device for pivotally supporting the device, actuating means mounted on one of said cooperating means and movable relatively thereto to effect pivotal engagement of said cooperating means when said device is positioned to initiate the engagement of said cooperating means and turned in one direction, and means associated with said device operative in one position to engage said actuating means whereby to effect disengagement of said cooperating means when the device is turned in the opposite direction from its normal position.

13. In combination, a support, a device to be supported, engageable cooperating means on said support and said device for pivotally supporting the device, actuating means mounted on one of said cooperating means and movable relatively thereto and means operative to engage said actuating means whereby to effect disengagement of said cooperating means when the device is turned in a given direction from its normal position.

14. In combination, a device, a support for said device, means for attaching said device to said support so that the device is rotatable about a given axis, and means engageable by said device for effecting the detachment thereof from said support in response to a predetermined rotary movement of the device.

15. In combination, a device, a support for said device, and means for attaching said device to said support so that the device is rotatable about a given axis including a member pivotally mounted on said support and engageable by said device for effecting the attachment and detachment of said device to and from said support in response to predetermined rotary movements of the device.

16. In combination, a device, a support for said device, and means for pivotally attaching said device to said support for a given angular movement about a given axis including means engageable by the device in response to a predetermined rotary movement thereof for effecting a translatory movement of the pivotal axis of the device until said pivotal axis coincides with said given axis.

17. In combination, an electrical device, a support for said device, an electrical contact on said device and a cooperating contact on said support, means for attaching said device to said support so that the device is rotatable about a given axis, and means engageable by said device for producing translatory movement thereof relatively to said support and for effecting the attachment of the device to the support in response to a predetermined rotary movement of the device.

LEONARD J. LINDE.